UNITED STATES PATENT OFFICE.

ADOLF MARXSEN, OF OSDORF, GERMANY.

INSECTICIDE.

SPECIFICATION forming part of Letters Patent No. 633,766, dated September 26, 1899.

Application filed February 7, 1899. Serial No. 704,835. (No specimens.)

*To all whom it may concern:*

Be it known that I, ADOLF MARXSEN, gardener, of Osdorf, near Blankenese, German Empire, have invented a certain new and useful Improvement in Preparations for the Extermination of Schizoneura Lanigera, of which the following is a statement.

This invention relates to an improved preparation for the extermination of *Schizoneura lanigera* (apple-root plant-louse, woolly louse of the apple) and the process for the manufacture of same.

Eighteen parts of quicklime are mixed with four parts of flowers of sulphur, six parts of fresh milk, two parts of sapocarbol, two parts of methylated spirit, four parts of lampblack, and six parts of water, so as to form a pulpy mass. The preparation process by constantly stirring the mixture is dissolved in water when required for use, and it is advisable to employ four parts of water to one part of the preparation. It is employed by painting it on or spreading it over the fruit-trees in the usual manner.

Having now particularly described my invention, what I claim as new, and desire to secure by Letters Patent, is—

An improved preparation for the destruction of *Schizoneura lanigera* consisting of eighteen parts of quicklime, four parts of flowers of sulphur, six parts of fresh milk, two parts of sapocarbol, two parts of methylated spirit, four parts of lampblack and six parts of water, the whole being mixed together and stirred so as to form a pulpy mass, which when required for use may be advantageously diluted with water.

Dated this 23d day of January, 1899.

ADOLF MARXSEN.

In presence of—
 E. H. L. MUMMENHOFF,
 GEO. LANDRÉY.